United States Patent
Tanty et al.

(10) Patent No.: US 11,105,591 B2
(45) Date of Patent: Aug. 31, 2021

(54) ANTI-PROJECTILE PROTECTION DEVICE FOR AN ATTACHMENT MEANS AND INSPECTION HATCH IMPLEMENTING SUCH A DEVICE

(71) Applicant: NEXTER SYSTEMS, Roanne (FR)

(72) Inventors: Fabien Tanty, Bourges (FR); Didier Mallat, Bourges (FR); David Lebaillif, Bourges (FR)

(73) Assignee: NEXTER SYSTEMS, Roanne (FR)

( * ) Notice: Subject to any disclaimer, the term of this patent is extended or adjusted under 35 U.S.C. 154(b) by 314 days.

(21) Appl. No.: 16/471,040

(22) PCT Filed: Dec. 18, 2017

(86) PCT No.: PCT/FR2017/053638
§ 371 (c)(1),
(2) Date: Jun. 19, 2019

(87) PCT Pub. No.: WO2018/115671
PCT Pub. Date: Jun. 28, 2018

(65) Prior Publication Data
US 2020/0018573 A1    Jan. 16, 2020

(30) Foreign Application Priority Data
Dec. 19, 2016 (FR) ...................................... 1601818

(51) Int. Cl.
*F41H 5/013* (2006.01)
*F16B 5/02* (2006.01)
(Continued)

(52) U.S. Cl.
CPC ........... *F41H 5/013* (2013.01); *F16B 5/0241* (2013.01); *F16B 5/065* (2013.01); *F16B 21/09* (2013.01)

(58) Field of Classification Search
CPC ........ F41H 5/013; F16B 5/0241; F16B 5/065; F16B 21/09
See application file for complete search history.

(56) References Cited

U.S. PATENT DOCUMENTS

| | | | | | |
|---|---|---|---|---|---|
| 1,276,312 | A | * | 8/1918 | Ballenberg | ............. F16B 21/09 403/315 |
| 1,724,601 | A | * | 8/1929 | Kellogg | .................. B60R 13/04 428/99 |

(Continued)

FOREIGN PATENT DOCUMENTS

| | | |
|---|---|---|
| DE | 20 2006 013527 U1 | 12/2006 |
| FR | 2906852 A1 | 4/2008 |
| FR | 2929918 A1 | 10/2009 |

OTHER PUBLICATIONS

Mar. 28, 2018 International Search Report issued in International Patent Application No. PCT/FR2017/053638.
(Continued)

*Primary Examiner* — Joshua E Freeman
(74) *Attorney, Agent, or Firm* — Oliff PLC

(57) ABSTRACT

An anti-projectile protection device for an attachment means of a member attached to a wall of a structure includes a plate designed to be spaced apart from the attachment means and fixed directly or indirectly to the wall by means of deformable connecting tabs which are secured to the plate and on which engage connecting screws. The heads of the connecting screws are interposed between the plate and the tab in question and holes are created in the plate to allow the connecting screws to be tightened. The connecting tabs include notches such that the heads of the connecting screws can be engaged between the plate and the tab by simple translation of the plate when they are installed in their tapped holes. An inspection hatch also incorporates such a protection device.

8 Claims, 3 Drawing Sheets

(51) Int. Cl.
*F16B 5/06* (2006.01)
*F16B 21/09* (2006.01)

(56) References Cited

U.S. PATENT DOCUMENTS

| | | | | |
|---|---|---|---|---|
| 2,209,580 A * | 7/1940 | Sargent | ............... | E04B 1/7612 |
| | | | | 52/404.1 |
| 3,238,686 A * | 3/1966 | Pomeroy | ............ | E04F 13/0805 |
| | | | | 52/511 |
| 3,459,096 A * | 8/1969 | Parkin | ................... | F16B 39/24 |
| | | | | 411/523 |
| 3,695,386 A * | 10/1972 | Thien | ..................... | G10K 11/16 |
| | | | | 181/204 |
| 3,771,275 A * | 11/1973 | Seckerson | ............... | F16B 5/065 |
| | | | | 52/508 |
| H129 H * | 9/1986 | Hansen | .......................... | 52/764 |
| 4,671,583 A * | 6/1987 | Olson | .................... | B64D 45/02 |
| | | | | 439/801 |
| 4,841,838 A * | 6/1989 | Scully | ..................... | F41H 5/013 |
| | | | | 411/910 |
| 5,033,357 A * | 7/1991 | Seksaria | ................ | F41H 5/013 |
| | | | | 89/36.04 |
| 5,600,084 A | 2/1997 | Gonzalez | | |
| 5,792,974 A * | 8/1998 | Daqis | ..................... | F41H 5/013 |
| | | | | 109/49.5 |
| 7,234,890 B1 | 6/2007 | Marshall et al. | | |
| 8,267,003 B1 * | 9/2012 | Lou | ......................... | F41H 7/042 |
| | | | | 89/36.08 |
| 9,126,631 B2 * | 9/2015 | Lungershausen | ....... | F16B 43/02 |
| 9,615,658 B1 * | 4/2017 | Nobles | ................. | A47B 13/003 |
| 2005/0260034 A1 * | 11/2005 | Arbona | ................ | F16B 37/045 |
| | | | | 403/408.1 |
| 2008/0181745 A1 * | 7/2008 | Naik | ...................... | F16B 21/09 |
| | | | | 411/107 |
| 2017/0167519 A1 * | 6/2017 | Anseth | .................. | F16B 5/065 |

OTHER PUBLICATIONS

Mar. 28, 2018 Written Opinion issued in International Patent Application No. PCT/FR2017/053638.

Aug. 22, 2017 Search Report issued in French Patent Application No. 1601818.

Aug. 22, 2017 Written Opinion issued in French Patent Application No. 1601818.

* cited by examiner

ANTI-PROJECTILE PROTECTION DEVICE FOR AN ATTACHMENT MEANS AND INSPECTION HATCH IMPLEMENTING SUCH A DEVICE

The technical field of the invention is that of devices ensuring the protection of the interior of a structure, such as a vehicle, against the projection of members as a result of the explosion of an explosive device near the structure.

By structure is meant here both a vehicle, for example an armored vehicle, and a fixed structure, such as a command post.

When an explosive device, for example a blast mine, is activated near the structure, the resulting impact on the walls of the structure is such that the members fixed to the walls are sheared and violently projected to the interior of the structure, constituting as many wounding projectiles.

It has been proposed by patent FR2929918 to attach the internal members to the exterior of the wall, by designing through connections. Such an arrangement provides a positive bearing surface at the outer surface of the wall of the structure. This limits the likelihood of projection of the attachment means.

The heads of screws or bolts however are always likely to be sheared by the impact and to be projected to the interior the structure.

Document DE202006013527U1 also discloses a device for the quick attachment of a cowling on a wall. This device includes a connecting screw which has a head having an enlarged base and comprises a snap-on means which surrounds the head of the screw and has resilient tongues that ensure that a plate of a cowling is kept on the screw and at a distance from the wall. This device however does not prevent the projection of the screw heads of an attachment means of a member.

It is the aim of the invention to provide an anti-projectile protection device for such attachment means of a member attached to a wall of a structure.

More particularly, according to a particular embodiment, the invention makes it possible to prevent the projection of the attachment means of an inspection hatch closing an opening of a wall while keeping the hatch in position despite the breaking of its attachment means.

Thus, the invention relates to an anti-projectile protection device for an attachment means of a member attached to a wall of a structure, the device being characterized in that it includes a plate intended to be arranged at a distance from the attachment means and intended to be fixed directly or indirectly to the wall by means of deformable connecting tabs that are secured to the plate, and on which connecting screws engage, the heads of the connecting screws being intended to be interposed between the plate and the tab in question, holes being provided in the plate to allow the connecting screws to be tightened, the connecting tabs comprising notches such that the heads of the connecting screws can be engaged between the plate and the tab in question, by simple translation of the plate perpendicularly to the axes of the screws when they are installed in their corresponding tapped holes.

According to an embodiment, the plate is intended to be fixed directly to the wall, the connecting screws being intended to be engaged in the wall itself.

According to another embodiment, the device includes a plate intended to be arranged at a distance from an attachment means of a member which is an inspection hatch closing an opening on one side of the wall, and the plate is intended to be fixed indirectly to the wall while being fixed to the inspection hatch, the connecting screws being intended to be engaged in the inspection hatch itself, the plate thus closing the opening on the other side of the wall.

The plate could advantageously carry at least two studs arranged in the vicinity of an edge of the plate and providing for a shear take-up.

The plate could advantageously carry at least one bar arranged in the vicinity of an edge of the plate and providing for a shear take-up.

The invention also relates to an inspection hatch which is intended to close an opening on a first side of a wall and which is intended to be fixed to the wall by attachment means comprising heads arranged on a second side of the wall, the inspection hatch being characterized in that it is equipped with an anti-projectile protection device according to the invention, the device including a plate which is fixed to the inspection hatch by connecting screws, the plate having dimensions that are greater than that of the opening and being intended to thus cover the heads of the attachment means, the plate being thus intended to close the opening on the second side of the wall.

The plate of the inspection hatch could carry at least two studs arranged in the vicinity of an edge of the plate and providing for a shear take-up.

The plate of the inspection hatch could carry at least one bar arranged in the vicinity of an edge of the plate and providing for a shear take-up.

The invention will be better understood when reading the following description of various embodiments, the description being given with reference to the accompanying drawings and in which.

Figure 1A:
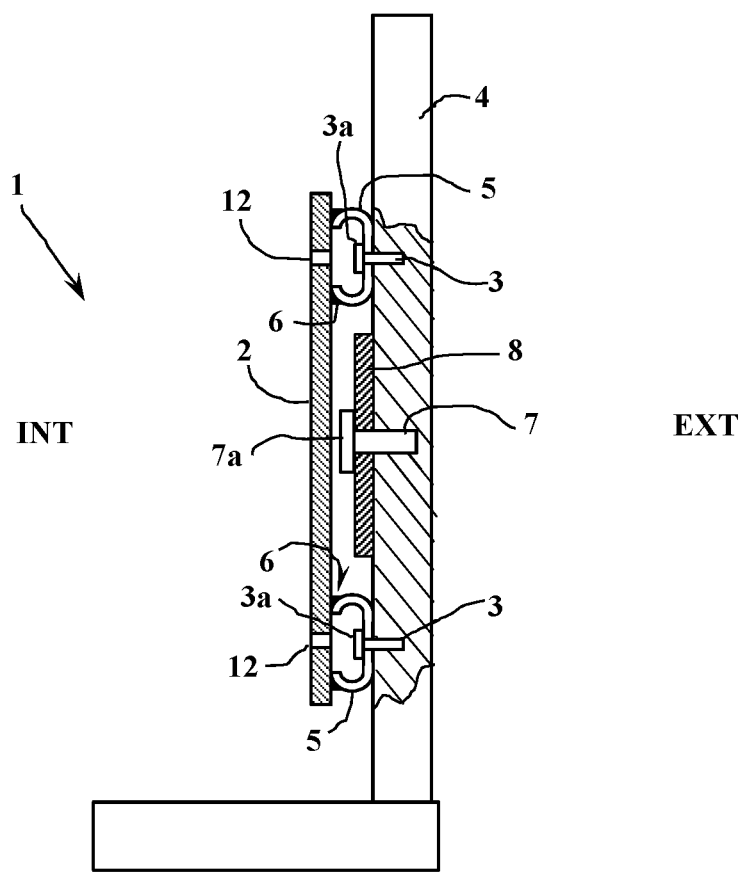
FIG. 1a shows in cross-section a first embodiment of a protection device according to the invention, fixed to a wall, the cross-section being at two connecting tabs.
Figure 1B:
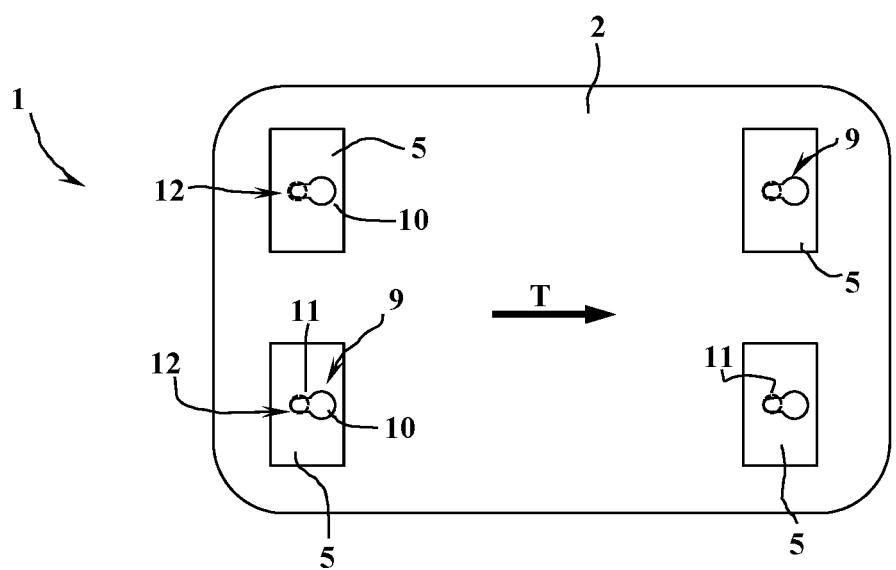
FIG. 1b shows in a front view the plate of this first embodiment of the invention, the view showing the face of the plate that is intended to be arranged facing the wall.

Referring to FIGS. 1a and 1b, an anti-projectile protection device 1 according to a first embodiment of the invention includes a plate 2 which is fixed directly to a wall 4 of a structure, for example an armored vehicle, by connecting screws 3 which are engaged in tapped holes of the wall 4.

The plate 2 is arranged at a distance from an attachment means 7 of a member 8 which is attached to the wall 4 by the attachment means 7 and on the internal face thereof. The attachment means 7 are here screws engaged in complementary tapped holes provided in the wall 4.

Thus, in the event of an explosion of a device at the exterior EXT of the structure, the stresses experienced by the wall 4 and the deformations thereof are likely to result in the attachment means 7 being sheared and its head 7a being projected to the interior INT of the structure. The plate 2 is interposed between the attachment means 7 and the interior INT of the structure. It therefore prevents this attachment means 7 from being projected to the interior of the structure and thus protects the persons occupying the structure.

The heads 3a of the connecting screws 3 are bearing on connecting tabs 5 which are secured to the plate 2. These connecting tabs 5 have a shape adapted to make it possible the structure and the plate to be mechanically separated from each other (here, a stirrup shape). The connecting tabs 5 are connected to the plate 2, for example by spot welds 6. The connecting tabs 5 are deformable members and are, for example, made of steel. They are capable of deforming, thus allowing a movement of the plate 2 and the wall 4 (for example, a movement bringing them closer to each other).

As can be seen in FIG. 1b, the plate 2 carries four tabs 5 arranged substantially at the corners of the plate 2. Each tab 5 carries a notch 9 which makes it possible to engage the head 3a of a connecting screw 3 between the plate 2 and the tab 5 in question, as can be seen in FIG. 1a.

Figure 2A:
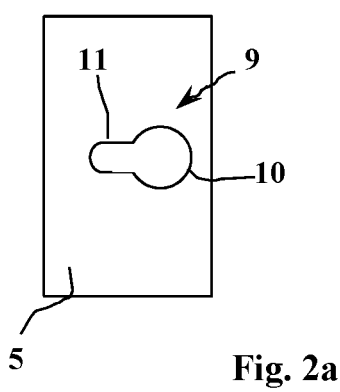
FIG. 2a is an enlarged view of a connecting tab.

As shown in FIGS. 1b and 2a, each notch 9 is constituted by a hole 10 of a large diameter (diameter greater than that of the head 3a of the screw) and in the continuity thereof there is a groove 11 of a width that is smaller than the diameter of the head 3a of the screw.

To position the plate 2 on the wall 4 which already carries the four connecting screws 3, it is sufficient to place the holes 10 so that they face the heads 3a of the screws. Then, by a simple translation of the plate in the direction T parallel to the grooves 11, the screw heads are positioned at the grooves 11.

The translation T is performed perpendicular to the axes of the screws 3 when they are installed in their tapped holes and all the notches 9 are oriented in the same way. Therefore, the four heads 3a of the screws 3 are positioned simultaneously between the plate 2 and their tabs 5.

As seen in FIG. 1a, the plate 2 also carries holes 12 which are also shown in dashed lines in FIG. 1b. These holes 12 are located facing the grooves 11 and they have a diameter that is smaller than that of the heads 3a of the screws 3. The holes 12 allow the passage of a clamping tool (not shown), for example a screwdriver or a wrench. It is thus possible to proceed, after having positioned the plate 2, with the tightening of the connecting screws 3. The plate 2 is then secured to the wall 4 by means of the connecting screws 3.

Due to the elasticity of the connection of the plate 2 by the tabs 5, the plate 2 remains secured to the wall 4 despite the impact. Moreover, the deformations of the wall may be absorbed by the connecting tabs 5. The protective function against the projection of the attachment means 7 thus remains ensured.

It can be also noted that, even in case a head 3a of the connecting screws 3 breaks off, this head 3a remains trapped between the plate 2 and the wall 4 and is therefore not projected to the interior INT of the structure. The heads 3a can not pass through the holes 12 whose diameter is smaller than that of the heads 3a.

Figure 2B:
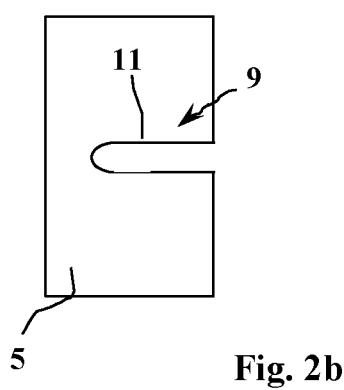
FIG. 2b is an enlarged view of a connecting tab according to an alternative embodiment.

By way of a variant represented in FIG. 2b, the notches 9 could be made in the form of simple grooves 11 opening onto a lateral edge of the connecting tab 5. In this case, it is no longer necessary to have a hole 10 of a large diameter since the body of the screw 3 can be inserted in the groove 11.

Figure 3:
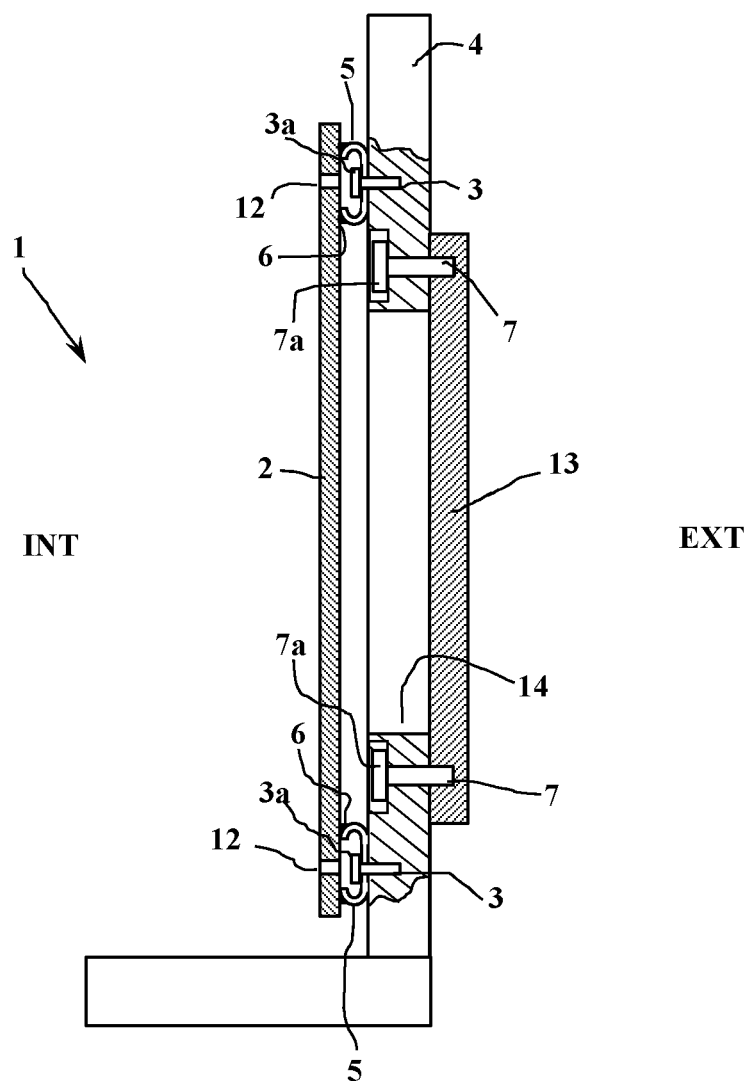
FIG. 3 is a cross-sectional view of a second embodiment of a protection device according to the invention, fixed to a wall, the device being positioned facing an inspection hatch, the cross-section being at two connecting tabs.

FIG. 3 shows a second embodiment of the invention. This embodiment is suitable for the protection against the projections of attachment means 7 (for example screws) of an inspection hatch 13 which closes an opening 14 provided in the wall 4.

Inspection hatches are frequently used in fixed structures or mobile structures such as vehicles.

They make it possible to close a passage to an area accommodating equipment or mechanical members.

According to this embodiment, the plate 2 is substantially identical to that described with reference to FIGS. 1a and 1b. It is fixed directly to the wall 4 by connecting screws 3 which are engaged in tapped holes of the wall 4. The plate 2 is arranged at a distance from the attachment means 7 of the hatch 13. It has dimensions that are sufficient for it to be positioned facing all the attachment means 7.

Thus, in case of an explosion of a device at the exterior EXT of the structure, the plate prevents the heads 7a of the attachment means 7 from being projected to the interior INT of the structure and thus protects the persons occupying the structure.

As in the previous embodiment, the heads 3a of the connecting screws 3 bear on connecting tabs 5 which are integral with the plate 2. The connecting tabs 5 are again deformable members and are, for example, made of steel. They are capable of deforming, thus allowing a movement of the plate 2 and the wall 4 (for example, a movement bringing them closer to each other). As in the previous embodiment, the plate 2 carries four tabs 5 arranged substantially at the corners of the plate 2. FIG. 1b can be considered as showing the shape of the plate for this embodiment. As in the previous embodiment, each tab 5 carries a notch 9 which will make it possible to engage the head 3a of a connecting screw 3 between the plate 2 and the tab 5 in question.

Figure 4A:
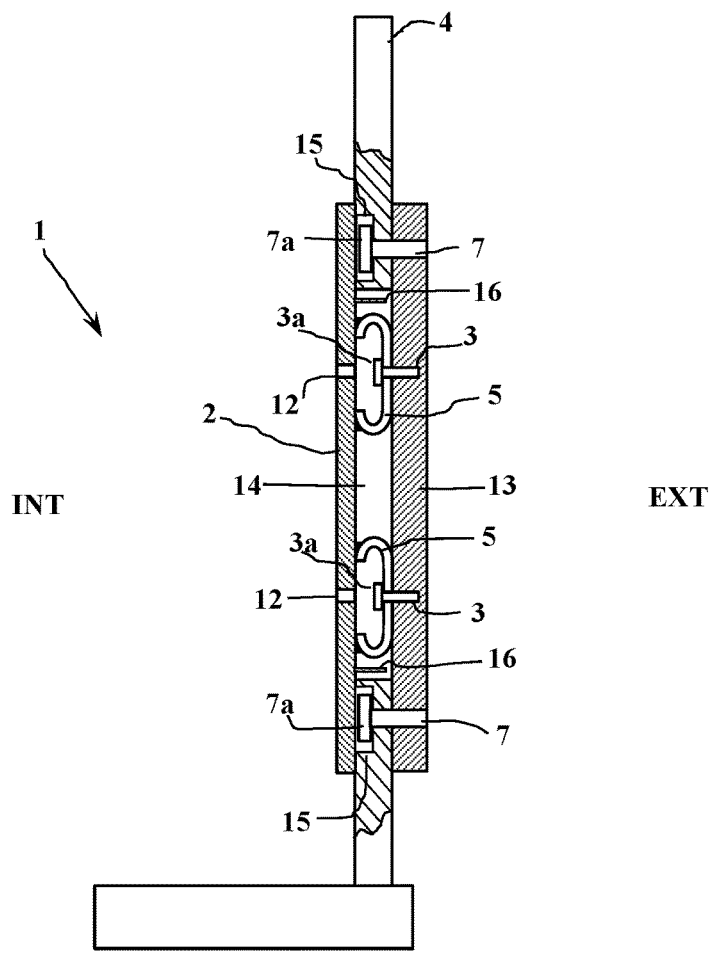
FIG. 4a shows in cross section a third embodiment of a protection device according to the invention, fixed to an inspection hatch according to the invention, the cross-section being at two connecting tabs.
Figure 4B:
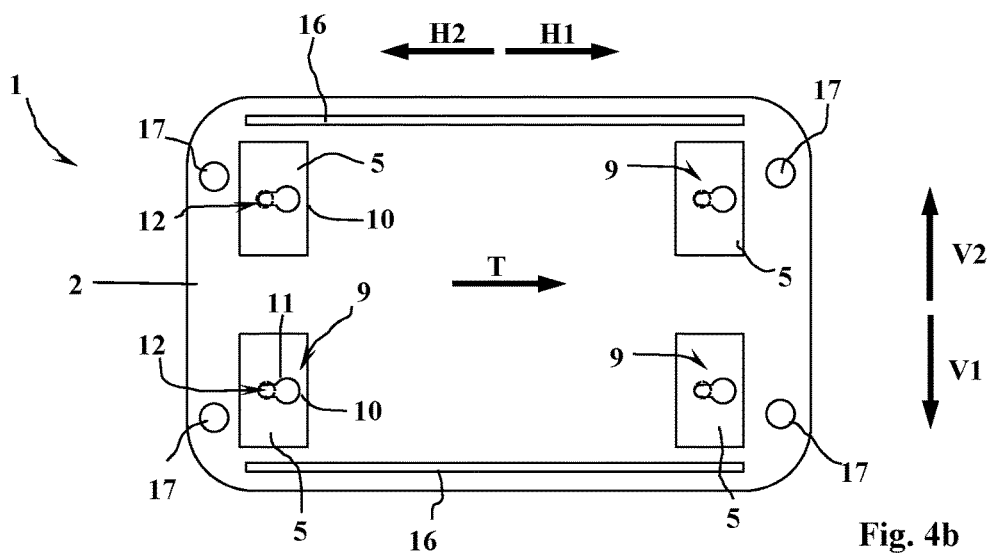
FIG. 4b shows in front view the plate of this third embodiment of the invention, the view showing the face of the plate intended to be arranged facing the hatch.

FIGS. 4a and 4b show a third embodiment of the invention which differs from the second embodiment in that the plate 2 is fixed indirectly to the wall 4, by being fixed directly to the inspection hatch 13 itself. This mode also shows an inspection hatch according to the invention.

To that end, the inspection hatch 13 comprises tapped holes for receiving the connecting screws 3. As in the previous embodiments, the plate 2 carries deformable connecting tabs 5, fixed for example by welding. Each connecting tab 5 includes, as shown in FIG. 4b, a notch 9 which makes it possible to engage the head 3a of a connecting screw 3 between the plate 2 and the tab 5 in question. Each notch 9 is again constituted by a hole 10 of a large diameter (diameter greater than that of the head 3a of the screw) and in the continuity thereof there is a groove 11 of a width that is smaller than the diameter of the head 3a of the screw.

To position the plate 2 on the hatch 13 which already carries the four connecting screws 3, it is sufficient to place the holes 10 so that they face the heads 3a of the screws. Then, by a simple translation of the plate in the direction T parallel to the grooves 11, the screw heads are positioned at the grooves 11.

The translation T is performed perpendicular to the axes of the screws 3 when they are installed in their tapped holes and all the notches 9 are oriented in the same way. Therefore, the four heads 3a of the screws 3 are positioned simultaneously between the plate 2 and their tabs 5.

Again the plate 2 carries holes 12 (FIG. 4a) which are also shown in dashed lines in FIG. 4b. These holes 12 have a diameter that is smaller than that of the heads 3a of the screws 3 and allow the passage of a clamping tool making it possible, after having positioned the plate 2, to tighten the connecting screws 3. The plate 2 is then secured to the hatch 13 by means of the connecting screws 3.

As can be seen in FIG. 4a, the plate 2 has dimensions such that it covers all the means 7 (screws) providing for the attachment of the hatch 13 on the wall. As the heads 7a of the attachment means 7 of the hatch 13 are housed in counterbores 15 of the wall 4, the plate 2 comes to bear on the wall 4. Attaching the plate 2 on the hatch 13 is thus particularly discreet and some sealing is provided between the plate 2 and the opening 14.

The elasticity of the connecting tabs 5 facilitates positioning the plate 2 so that it bears against the wall 4 during the tightening of the connecting screws 3.

The deformation of the tabs 5 again makes it possible to absorb the deformations of the wall that result from an explosion.

As can be seen in FIGS. 4a and 4b, the plate 2 carries at least two bars 16 which are welded to its face facing the hatch 13. These bars 16 constitute vertical stops cooperating with the horizontal edges of the opening 14 to limit the movement of the plate 2 along the directions V1 and V2. Such an arrangement also makes it possible to avoid the connecting screws 3 being sheared off during a movement of the plate 2, for example as a result of a deformation of the wall 4 subsequent to the initiation of an explosive device nearby.

Similarly, the plate 2 carries four studs 17 welded to its face facing the hatch 13. These studs 17 constitute horizontal stops cooperating with the vertical edges of the opening 14 to limit the movement of the plate 2 along the directions H1 and H2. Such an arrangement also makes it possible to avoid the connecting screws 3 being sheared off during a horizontal movement of the plate 2.

This third embodiment of the invention makes it possible to maintain the hatch in position despite the breaking of the attachment means 7. Indeed, the plate 2 remains secured to the hatch 13. The surface area of the plate is greater than that of the opening 14. It therefore closes it on the interior INT side. The bars 16 and the studs 17 also position the plate carrying the hatch, with respect to the opening 14.

It would of course be possible to replace each bar 16 by two other studs 17 arranged in the vicinity of a horizontal edge of the plate so as to limit the vertical movements V1 and V2.

Conversely, it would be possible to replace each stud or each pair of studs 17 by a vertical bar 16, adjacent to a vertical edge of the plate, thus arranged to limit the horizontal movements H1 and H2.

The invention claimed is:

1. An anti-projectile protection device for an attachment means of a member attached to a wall of a structure, wherein the device includes a plate intended to be arranged at a distance from the attachment means and intended to be fixed directly or indirectly to the wall by means of deformable connecting tabs that are secured to the plate, and on which connecting screws engage, the heads of the connecting screws being intended to be interposed between the plate and the tab in question, holes being provided in the plate to allow the connecting screws to be tightened, the connecting tabs comprising notches such that the heads of the connecting screws can be engaged between the plate and the tab in question, by simple translation of the plate perpendicularly to the axes of the screws when they are installed in their corresponding tapped holes.

2. The anti-projectile protection device according to claim 1, wherein the plate is intended to be fixed directly to the wall, the connecting screws being intended to be engaged in the wall itself.

3. The anti-projectile protection device according to claim 1 and including a plate intended to be arranged at a distance from an attachment means of a member which is an inspection hatch closing an opening on one side of the wall, wherein the plate is intended to be fixed indirectly to the wall while being fixed to the inspection hatch, the connecting screws being intended to be engaged in the inspection hatch itself, the plate thus closing the opening on the other side of the wall.

4. The anti-projectile protection device according to claim 1, wherein the plate carries at least two studs arranged in the vicinity of an edge of the plate and providing for a shear take-up.

5. The anti-projectile protection device according to claim 1, wherein the plate carries at least one bar arranged in the vicinity of an edge of the plate and providing for a shear take-up.

6. An inspection hatch which is intended to close an opening on a first side of a wall and which is intended to be fixed to the wall by attachment means comprising heads arranged on a second side of the wall, wherein the inspection hatch is equipped with an anti-projectile protection device according to claim 3, the device including a plate which is fixed to the inspection hatch by connecting screws, the plate having dimensions that are greater than that of the opening and being intended to thus cover the heads of the attachment means, the plate being thus intended to close the opening on the second side of the wall.

7. The inspection hatch according to claim 6, wherein the plate carries at least two studs arranged in the vicinity of an edge of the plate and providing for a shear take-up.

8. The inspection hatch according to claim 6, wherein the plate carries at least one bar arranged in the vicinity of an edge of the plate and providing for a shear take-up.

* * * * *